United States Patent

[11] 3,589,448

[72] Inventor James E. Gay
   Vinton, Iowa
[21] Appl. No. 763,072
[22] Filed Sept. 27, 1968
[45] Patented June 29, 1971
[73] Assignee J. I. Case Company

[54] TRIP MECHANISM FOR GROUND-WORKING IMPLEMENT
   15 Claims, 6 Drawing Figs.
[52] U.S. Cl. .................................... 172/264,
   172/705
[51] Int. Cl. .................................... A01b61/04,
   A01b 35/24
[50] Field of Search .................................... 172/261-
   —264, 705

[56] References Cited
   UNITED STATES PATENTS
3,052,308  9/1962  Quanbeck .................. 172/264
3,326,300  6/1967  Morkoski et al. .......... 172/264
3,416,611  12/1968  Fischer .................... 172/264 X
3,468,382  9/1969  Quanbeck .................. 172/264
   FOREIGN PATENTS
130,722  1960  U.S.S.R. .................... 172/261

Primary Examiner—Robert E. Pulfrey
Assistant Examiner—Stepehn C. Pellegrino
Attorney—Dressler, Goldsmith, Clement & Gordon ABSTRACT: A tillage implement having a plurality of spaced ground-working tools, with safety trip means for each tool allowing the tool to move from a normal ground-penetrating position to a position elevated thereabove when an obstruction, such as a rock or a stump, is encountered. Each ground-working tool is mounted for free-swinging movement between the ground-penetrating position and a fully elevated position above the ground, and the tool is positively guided to and from the ground-working position, with the guiding means functioning to allow the ground-working tool to initially move out of the ground-penetrating position without substantial downward movement into the ground, and with the guiding means also functioning to direct the ground-working tool back into the ground at the proper angle of reentry. Hydraulic cylinder means continuously biases each tool toward the ground-penetrating position, with the hydraulic cylinder means yieldably resisting movement of the tool away from the ground-penetrating position and returning the ground-working tool into the ground-penetrating position after the obstruction has been cleared.

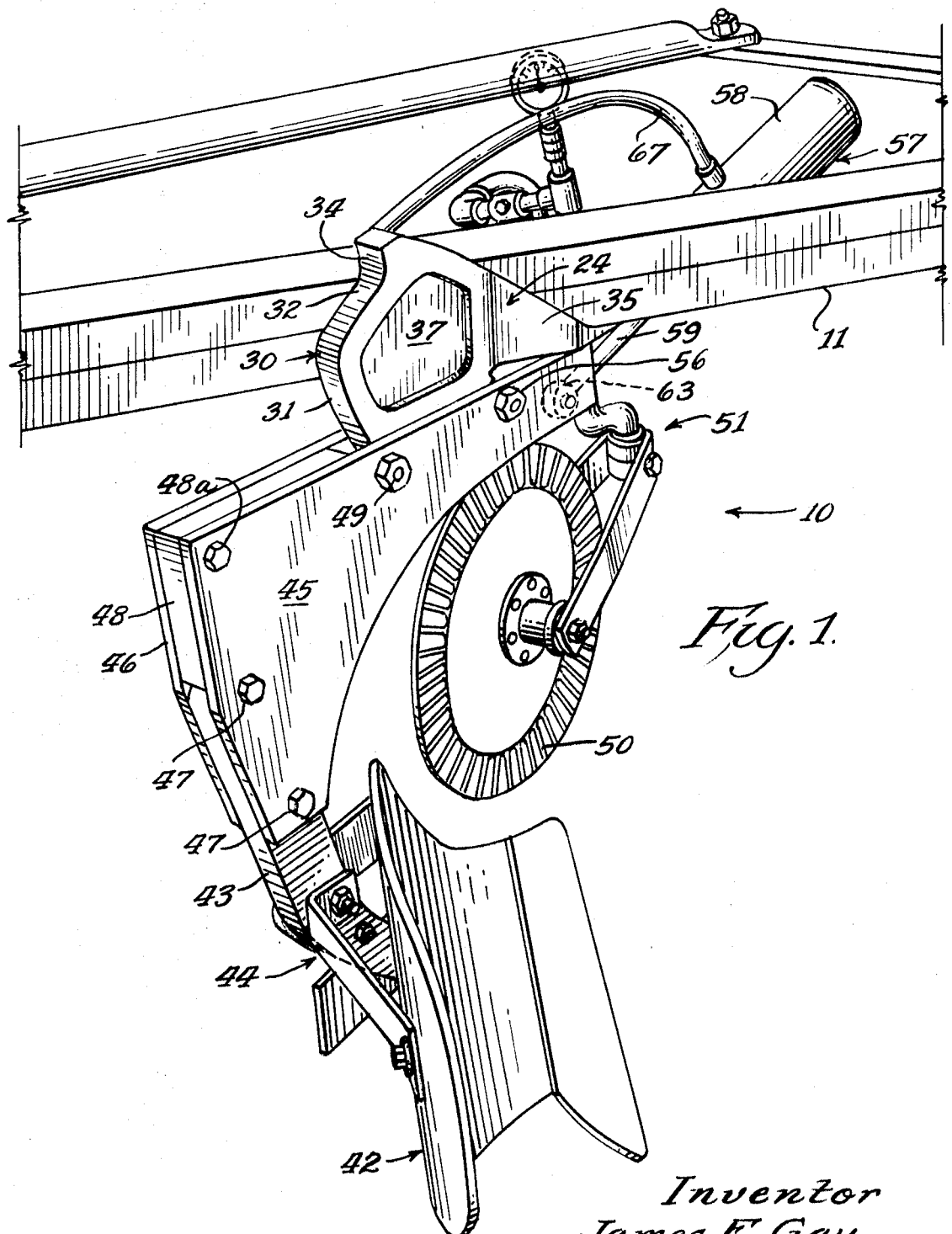

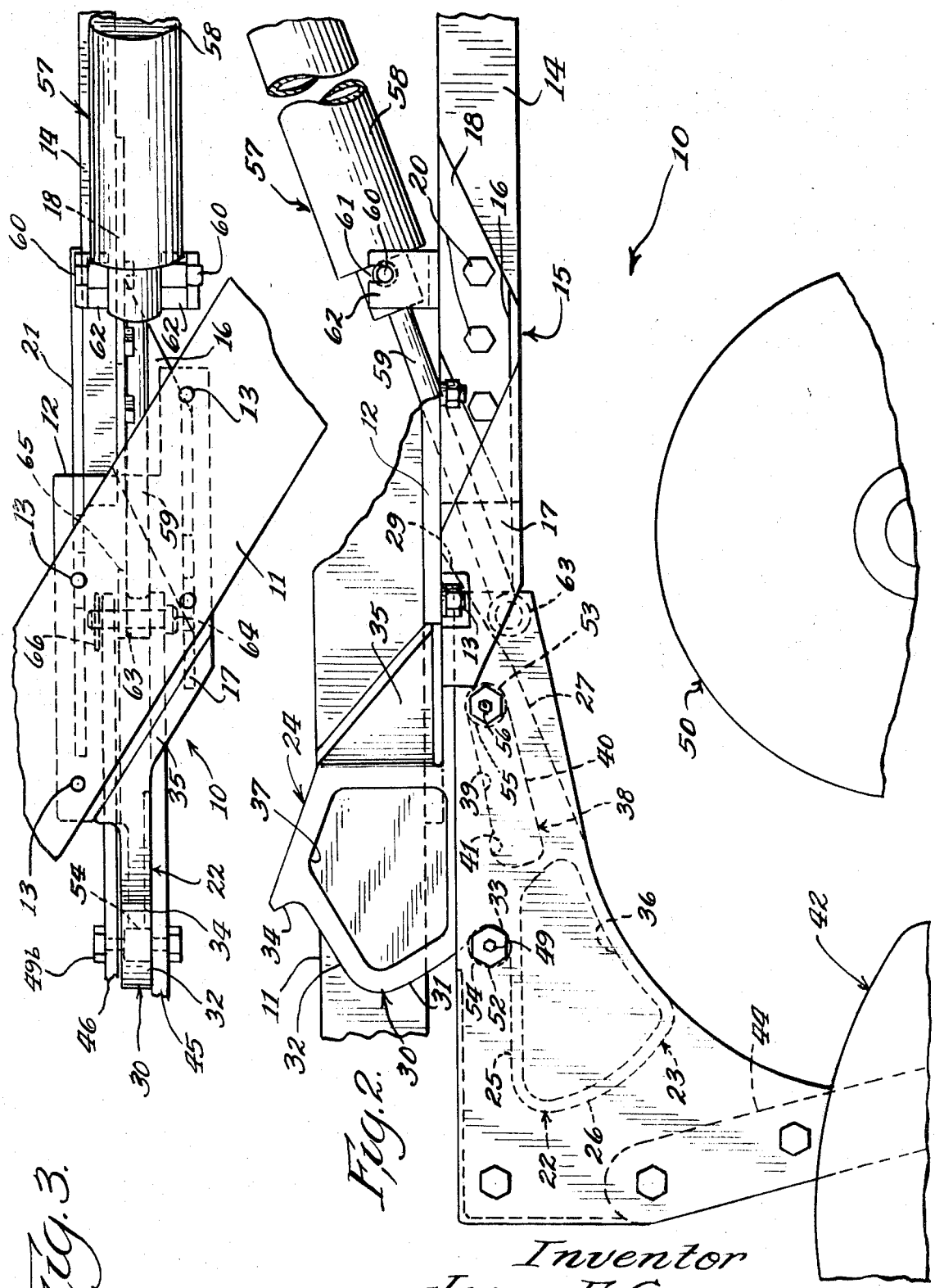

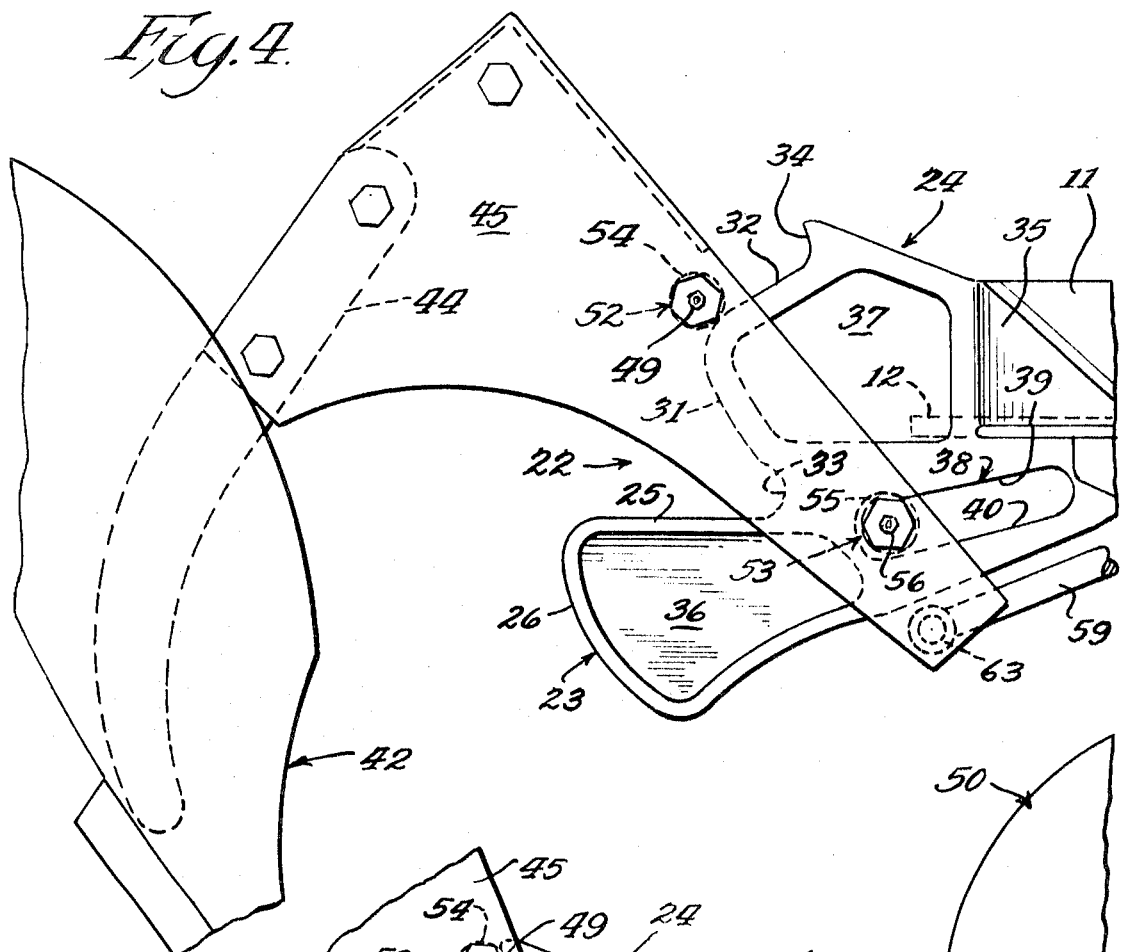
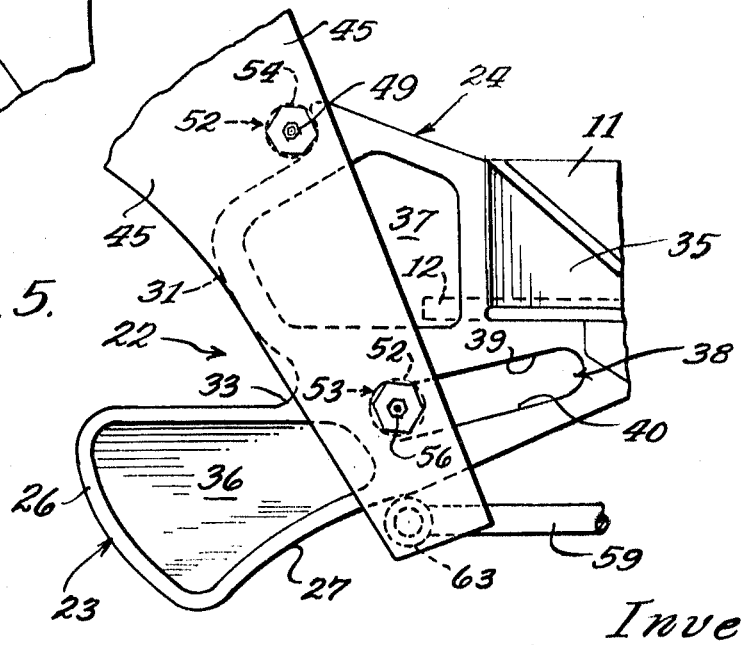

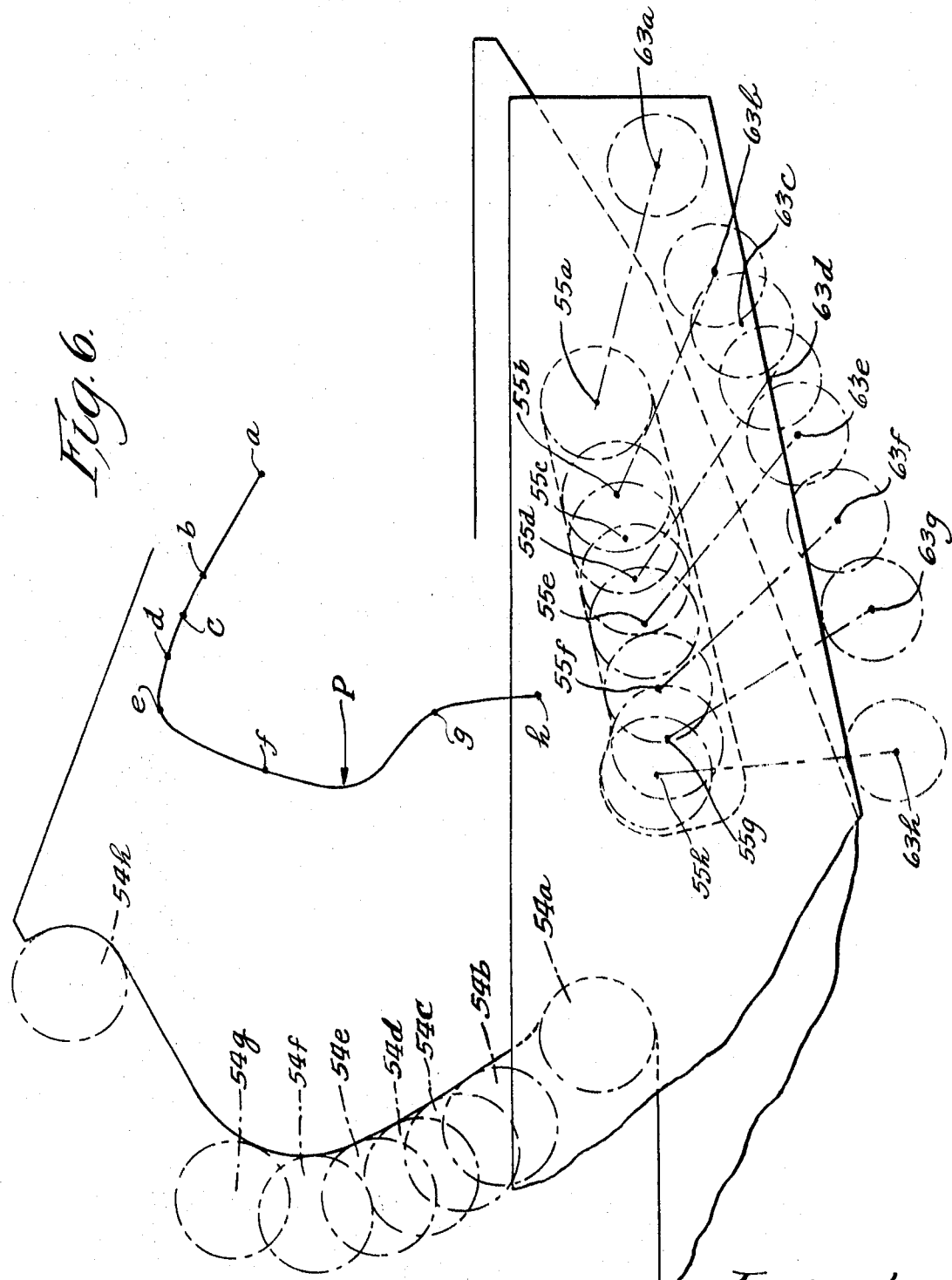

TRIP MECHANISM FOR GROUND-WORKING IMPLEMENT

BACKGROUND OF THE INVENTION

Tillage implements having safety trip mechanisms for protecting a ground-working tool against damage when an obstruction is encountered have been well known in the past. It is also well known to automatically return the ground-working tool from a tripped obstruction clearing position to a normal or operating ground penetrating position by spring means or hydraulic cylinder means, thereby avoiding the necessity of having to stop the tractor and manually reset the tool.

In safety trip mechanisms employing hydraulic cylinder means for automatically returning the ground-working tool to the operative ground-penetrating position, it has been conventional to have the piston rod fully extended from the cylinder during normal ground-tilling operation, with the piston rod being movable inwardly of the cylinder when an obstruction is encountered. This arrangement has proven to be extremely undesirable, since the exposed portion of the polished rod is subject to damage by rocks and the like, and also corrodes after an extended period of use.

One of the recent innovations in safety trip mechanisms has been the provision of a "high pivot" which enables the ground-working tool to move out of the ground-penetrating position without substantial initial movement downwardly into the ground. Such structures have not proven entirely satisfactory, in view of their failure to provide suitable structure for positively guiding the ground-working tool during its entire movement between the ground-penetrating and tripped positions. In known "high pivot" trip mechanisms, the ground-working tool is pivoted directly upon the implement frame. This limits the movement of the ground-working tool relative to the frame to pure pivoting movement, and does not allow the initial movement of the tool from the ground-penetrating position to be along a flat shallow arc. The pure pivotal movement also does not set up the proper angle of reentry of the tool into the ground when it returns to the ground-working position.

In certain types of safety trip mechanisms, the ground-working tool is releasably latched in the operative ground-penetrating position with resilient means biasing the latching structure, so that the ground-working tool is free to move slightly during use without tripping. The latched type of safety trip mechanism is undesirable in many respects, in that it requires a rather complicated latching mechanism, which is not only expensive to manufacture and maintain, but which is also subject to wear and breakage after extended periods of use.

Recognizing the deficiencies of the latched type of safety trip mechanism, it has been recently proposed to provide a safety trip mechanism of the "free floating" variety wherein the ground-working tool is free to move out of the ground-working position against the bias of a spring or a hydraulic cylinder. In "free floating" mechanisms that have been proposed to date, complex and costly linkage structures have been employed to support the ground-working tool for movement out of the ground-penetrating position and back thereto, unduly increasing the initial cost of the implement, and complicating maintenance problems in use.

SUMMARY OF THE INVENTION

The safety trip mechanism of the present invention is of the automatic reset variety, and includes hydraulic cylinder means for constantly urging the ground-working tool toward the ground-penetrating position, and for returning the ground-working tool to the ground-penetrating position when it moves away therefrom. In contrast to prior art latched type of trip mechanisms, the trip mechanism of the present invention allows the ground-working tool to move freely along an unobstructed path in moving from and back into the ground-penetrating position.

The trip mechanism of the present invention includes novel cooperating guiding and mounting members on the implement frame and on the ground-working tool for insuring that the ground-working tool will move out of the ground-penetrating position without moving deeper into the ground, and for reentering the ground at the proper angle of suck.

In applicant's trip mechanism, the ground-working tool is continuously urged toward the ground-penetrating position by a hydraulic cylinder assembly that is connected between the tool and the implement frame. In applicant's arrangement, the piston rod is fully retracted in the ground-penetrating position of the tool, in distinction to prior art arrangements wherein the piston rod is fully extended in the ground-penetrating position of the tool. This arrangement allows the cylinder to protect the piston rod from external abuse during normal operation of the implement, and the piston rod is exposed for only a short duration when the ground-working tool encounters an obstruction.

In applicant's "high pivot" arrangement, first and second spaced cam follower means are provided in the ground-working tool, with the cam follower means cooperating with first and second cam surfaces associated with the implement frame. The first cam surface is provided internally of the implement frame, and is in the form of an elongate, rearwardly extending, slightly downwardly inclined slot having an upraised portion at the rearward end thereof. The second cam surface is provided on an exposed rearward portion of the implement frame, and includes a first rearwardly and upwardly inclined portion, and a second upwardly and forwardly inclined portion. The cam follower means are related to the cam surfaces in a manner such that the ground-working tool rotates about a continuously moving instantaneous center as the cam follower means move along their respective cam surfaces during movement of the ground-working tool between the ground-penetrating position and the fully elevated position. The continuously moving instantaneous centers trace a curvilinear path, with the locus of the instantaneous centers being related to the biasing force of the hydraulic cylinder means such that the minimum biasing force is applied to the ground-working tool in the fully elevated position. The biasing force of the hydraulic cylinder means gradually increases as the second cam follower means moves up the first portion of the second cam surface, and gradually decreases as the second cam follower means moves up the second portion of the second cam surface.

With this unique arrangement, the hydraulic cylinder assembly provides a relatively large force for resisting initial movement of the ground-working tool out of the ground-penetrating position, but when the ground-working tool has been moved a predetermined amount by engagement with an obstruction, the biasing force is reduced, so that the ground-working tool can readily move to an elevated position to clear the obstruction. Once the obstruction has been cleared, the hydraulic cylinder assembly returns the ground-working tool to the ground-penetrating position with a relatively large force.

BRIEF DESCRIPTION OF THE DRAWINGS

FIG. 1 is a rear perspective view of a portion of a tillage implement utilizing the trip mechanism of the present invention;

FIG. 2 is a fragmentary side elevational view of the structure illustrated in FIG. 1;

FIG. 3 is a fragmentary top plan view of the structure illustrated in FIGS. 1 and 2;

FIG. 4 is a fragmentary side elevational view, similar to FIG. 2, but showing the ground-working tool in a position intermediate the ground-penetrating position and the fully elevated position;

FIG. 5 is a fragmentary side elevational view, similar to FIGS. 2 and 4, and illustrating the ground-working tool in the fully elevated position; and FIG. 6 is a change position diagram illustrating the relationship of the effective lever arm of the hydraulic cylinder assembly in the various positions of the ground-working tool.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings in detail, the trip mechanism of the present invention is illustrated in use with a tillage implement 10 in the form of a moldboard plow, it being understood that the trip mechanism could be used with other types of ground-working tools. While only a single plow bottom and trip mechanism are illustrated and described, it will be appreciated that the trip mechanism is intended to be used in an implement having multiple ground-working tools. Furthermore, only a portion of the tillage implement itself is illustrated in the drawings and described in detail herein, in that it is not necessary to describe the complete implement for an understanding of the present invention.

The tillage implement 10 includes a box section frame member 11 that is disposed at an angle with respect to the direction of movement of the implement 10, as is well known. The box section frame member 11 is connected to conventional frame structure (not shown) having a hitch mechanism for connection to a tractive vehicle, such as a tractor.

A flat mounting plate 12 is secured to the lower surface of beam 11 by screws 13, or other suitable fasteners. While only one mounting plate 12 is illustrated, it will be appreciated that a mounting plate is provided for each ground-working tool of the tillage implement.

Each ground-working tool is carried by a frame structure that includes a longitudinally extending beam member 14, which is connected to the conventional implement frame structure (not shown). Beam 14 is secured to the mounting plate 12 by an irregularly shaped bracket 15, best seen in FIGS. 2 and 3. Bracket 15 is U-shaped in end elevation, and includes a central bight portion 16, with legs 17 and 18 extending upwardly from opposite sides of bight portion 16. Legs 17 and 18 are generally rhombidally shaped in side elevation (FIG. 2), with the legs 17 and 18 diverging outwardly from the bight portion 16. Rearwardly extending leg 17 is secured to the underside of mounting bracket 12 by welding, or the like, and forwardly extending leg 18 is secured to an upright face of beam 14 by one or more bolts 20.

A further longitudinally extending plate 21 is secured to the side of beam 14 opposite from bracket leg 18, and plate 21 is welded, or otherwise suitably secured, to the lower side of mounting plate 12.

A beam extension 22 is slightly laterally offset from beam 14 (FIG. 3), and extends rearwardly of the mounting plate 12 and box section 11. Beam extension 22 is generally heart shaped in side elevation (FIG. 2), and includes a first, lower lobe 23 and a second, upper lobe 24. Lower lobe 23 includes a generally horizontally disposed support surface 25 to establish a normal ground-penetrating position, as will hereafter appear. Lobe 23 further includes a downwardly and forwardly curved rearward surface 26, and an upwardly and forwardly converging lower surface 27 which provides a forwardly facing tapered front portion 28, the upper surface of which may be welded to the lower surface of mounting plate 12.

The upper lobe 24 includes a rearwardly facing cam surface 30 having an upwardly and rearwardly inclined first cam portion 31 and an upwardly and forwardly inclined second cam portion 32. First cam portion 31 merges with the support surface 25 on lobe 23 at a rounded junction 33, and a stop surface 34 extends generally perpendicularly outwardly from cam surface 32 at the upper end thereof. Stop surface 34 establishes a fully elevated position, and prevents the ground-working tool from going over center. The forwardmost portion of lobe 24 includes a tapered portion 35 that is inclined forwardly out of the plane of the extension 22. Portion 35 is disposed at essentially the same angle as box section 11, and may be secured thereto, as by welding.

The rearward central portions of lobes 23 and 24 are recessed to provide webs 36 and 37, respectively, to minimize the area of frictional contact with the sideplates of the ground-working tool during its movement out of, and back into, the ground-penetrating position, as will be understood from the ensuing description.

Beam extension 23 includes means mounting a ground-working tool for movement between the ground-penetrating position and the fully elevated position and the mounting means function to guide the ground-working tool during its movement between these positions. The mounting and guiding means includes an internal cam in the form of a longitudinally extending, slightly downwardly extending slot 38. Slot 38 includes a generally rectilinear upper surface 39, which functions as a cam surface, and a generally rectilinear lower surface 40 which functions as a guide surface. An upwardly extending notch 41 is provided at the rearward end of cam surface 39, and notch 41 is inclined slightly rearwardly.

The ground-working tool in the illustrated embodiment of the invention is in the form of a moldboard plow bottom 42 that is secured to a plow standard 43 by conventional support structure 44 (FIG. 1). The upper end of standard 44 is secured between spaced, parallel sideplates 45 and 46 by a pair of spaced bolts 47, and a spacer block 48 may be interposed between the sideplates 45 and 46 adjacent the upper end thereof to retain the sideplates in spaced parallel relation, with the spacer block 48 being secured in place by one or more bolts 48a. A trash-cutting coulter 50 may be suspended from the implement frame by conventional support structure 51, as is well known.

The ground-working tool 42 is mounted for movement between an operative ground-penetrating position (FIGS. 1 and 2) and a fully elevated position (FIG. 5) by cam follower means 52 and 53 engageable with cam surfaces 30 and 39, respectively. Cam follower means 52 is in the form of a roller 54 on the unthreaded central portion of a bolt 49 that extends between the sideplates 45 and 46. Cam follower means 53 is also in the form of a roller 55 on the unthreaded central portion of a bolt 56 that extends between sideplates 45 and 46.

The present invention includes means 57 for continuously biasing the tool 42 toward the operating ground-penetrating position in all positions of the tool. Biasing means 57 yieldably resists movement of the tool away from the ground-penetrating position, and automatically returns the tool to the ground-penetrating position after movement away therefrom. In the illustrated embodiment of the invention, biasing means 57 is defined by a hydraulic cylinder assembly including a cylinder 58 having a reciprocable ram in the form of a piston rod 59 extending outwardly therefrom. In the normal ground-penetrating position of the tool 42, piston rod 59 is disposed within cylinder 58, while in the fully elevated position, the piston rod 59 extends outwardly from the cylinder 58. The hydraulic cylinder assembly is removably mounted upon beam 14 by having a pair of outwardly extending pins 60 (FIG. 3) received in upwardly opening notches 61 in spaced upwardly extending legs of a trunnion block 62 that is fixed to beam 14.

The rearwardmost end of piston rod 59 includes a transverse sleeve 63 that is pivotally mounted on the unthreaded central portion of a bolt 64 which extends transversely between sideplates 45 and 46. A spacer 65 (FIG. 3) may be interposed between piston rod 59 and sideplate 46, with a cotter pin 66, or other suitable fastener, cooperating with the end of pivot bolt 64 to retain the same against movement relative to the sideplates 45 and 46.

Cylinder 58 is of the one-way variety, and fluid under pressure is provided through a hose 67 (FIG. 1) to continuously urge the piston rod 59 inwardly of the cylinder 58. A suitable hydraulic circuit for providing fluid under pressure includes, for example, an accumulator connected in a hydraulic circuit with hose 67 for providing fluid under pressure to retain the piston rod 59 in retracted position. The accumulator is preferably connected in circuit with hydraulic fluid means on the implement itself, such as in the circuit for controlling the tail wheel, so as to provide a ready source for recharging the accumulator.

During a normal plowing operation, each ground-working tool 42 is yieldably retained in the ground by its respective hydraulic cylinder assembly, with cam follower roller 54 resting on support surface 25 at junction 33 and with cam follower roller 55 being disposed at the forward end of slot 38. When one of the tools encounters an obstruction, the tool 42 moves in a low flat arc out of the ground-penetrating position toward the fully elevated, and cam follower roller 54 moves in an unobstructed path along cam 30 while cam follower roller 55 moves rearwardly along slot 38. During such movement, the tool rotates about a continuously moving instantaneous center which traces a path P, as illustrated in FIG. 6. As is evident from FIG. 6, the effective moment arm of the biasing means 57, i.e., the distance between the projection of piston rod 59 and the instantaneous center, has a minimum length when the ground-working tool is in the fully elevated position as shown by the reference numeral $h$ in FIG. 6. The effective moment arm has a maximum length when the cam follower roller 54 approaches the transitional, rearwardmost portion of cam surface 30 between cam portions 31 and 32. When the cam follower roller 54 is at the transitional portion of cam surface 30, the cam follower roller 55 is beginning its movement into the enlarged notch 41 at the rearward end of cam surface 39. As the cam follower roller 54 moves up cam surface 32 toward stop 34, cam follower roller 55 moves into notch 41 and the length of the effective moment arm gradually decreases. The engagement of cam follower roller 54 with stop 34 and the engagement of cam follower roller 55 with the end of slot 41 prevents the ground-working tool 42 from going over center, and the weight of the ground-working tool and the bias of the hydraulic cylinder means then cooperate to return the ground-working tool toward the ground-penetrating position. The attitude of surfaces 31, 39 and 40 are related to one another in a manner such that the ground-working tool 42 approaches the ground in a shallow arc, so that the tool will reenter the ground without difficulty and at the proper angle. The reengagement of cam follower roller 54 with the support surface 25 and of cam follower roller 55 with the end of slot 38 again properly locates the ground-working tool in the operating ground-penetrating position.

What I claim is:

1. A tillage implement comprising:
   a frame;
   a ground-working tool;
   means mounting said tool on said frame for free unobstructed movement away from an operating ground-penetrating position toward a fully elevated position above the ground, said means guiding said tool during movement between said positions;
   said mounting and guiding means including first and second guide means on said frame and first and second follower means on said tool cooperating, respectively, with said first and second guide means so that the instantaneous center of rotation of any two points on said tool at any position intermediate said ground-penetrating position and said fully elevated position falls along a fixed path, said first guide means including a generally rearwardly extending slot on said frame that provides an elongate surface on said frame, said first follower means being movable within said slot along said surface during movement of said tool between said operating ground-penetrating position and said fully elevated position; and
   biasing means having one end connected to the tool and an opposite end connected to the frame for continuously biasing said tool toward said operating ground-penetrating position in all positions of said tool for yielding resisting movement of said tool away from said position and for returning said tool to said position after movement away therefrom, the effective moment arm of said biasing means, defined by the spacing between the instantaneous center and a line through the connection of said biasing means at any given position, being related to the path of movement of said instantaneous centers of rotation such that said moment arm is of minimum length when said ground-working tool is in the fully elevated position.

2. A tillage implement as set forth in claim 1 wherein said biasing means is a hydraulic cylinder having its piston rod connected to said tool.

3. A tillage implement as set forth in claim 2 wherein the piston rod of said hydraulic cylinder is retracted when said tool is in said ground-penetrating position and is extended when said tool is in said fully elevated position.

4. A tillage implement as set forth in claim 1 wherein said slot includes a generally upwardly extending portion at the rearward end thereof.

5. A tillage implement as set forth in claim 1 wherein the second guide means of said mounting and guiding means is an external cam surface on said frame and the second follower means on said tool is a follower member movable along said cam surface.

6. A tillage implement as set forth in claim 5 wherein said external cam surface includes a surface means supporting said second follower means in the operating ground penetrating position of the tool.

7. A tillage implement as set forth in claim 6 wherein said external cam surface includes a first portion that extends rearwardly and upwardly from said surface means.

8. A tillage implement as set forth in claim 7 wherein said external cam surface includes a second portion that extends upwardly and forwardly from said first portion.

9. A tillage implement as set forth in claim 8 wherein stop means is provided at the upper end of said cam surface second portion.

10. A tillage implement as set forth in claim 8 wherein said cam surface portions are generally inclined.

11. A tillage implement as set forth in claim 1 wherein a plurality of ground-working tools are mounted at spaced locations on said frame, said biasing means being defined by a hydraulic cylinder for each tool, each hydraulic cylinder having a piston rod connected to its respective tool.

12. A tillage implement as set forth in claim 1 in which said second guide means is defined by a second external cam surface on said frame spaced from said slot; and wherein said second follower means is defined by a second follower movable along said external cam surface.

13. A tillage implement as set forth in claim 12 in which said external cam surface includes first and second cam portions, and wherein the effective moment arm of said biasing means gradually increases in length as said second follower moves along said external cam surface first portion, said effective moment arm gradually decreasing in length as said second follower moves along said external cam surface second portion.

14. A tillage implement as set forth in claim 13 wherein said effective lever arm has a maximum length at the junction between said external cam surfaces first and second portions.

15. A tillage implement as set forth in claim 14 wherein said biasing means is defined by a hydraulic cylinder assembly connected between said tool and said frame.